J. H. GREENSTREET.
WIRE BOUND BOX MACHINE.
APPLICATION FILED MAY 11, 1910.

991,716.

Patented May 9, 1911.
6 SHEETS—SHEET 1.

Witnesses
Frank A. Fahle
Thomas W. McNair

Inventor
Jason H. Greenstreet,
By Bradford Hood
Attorneys.

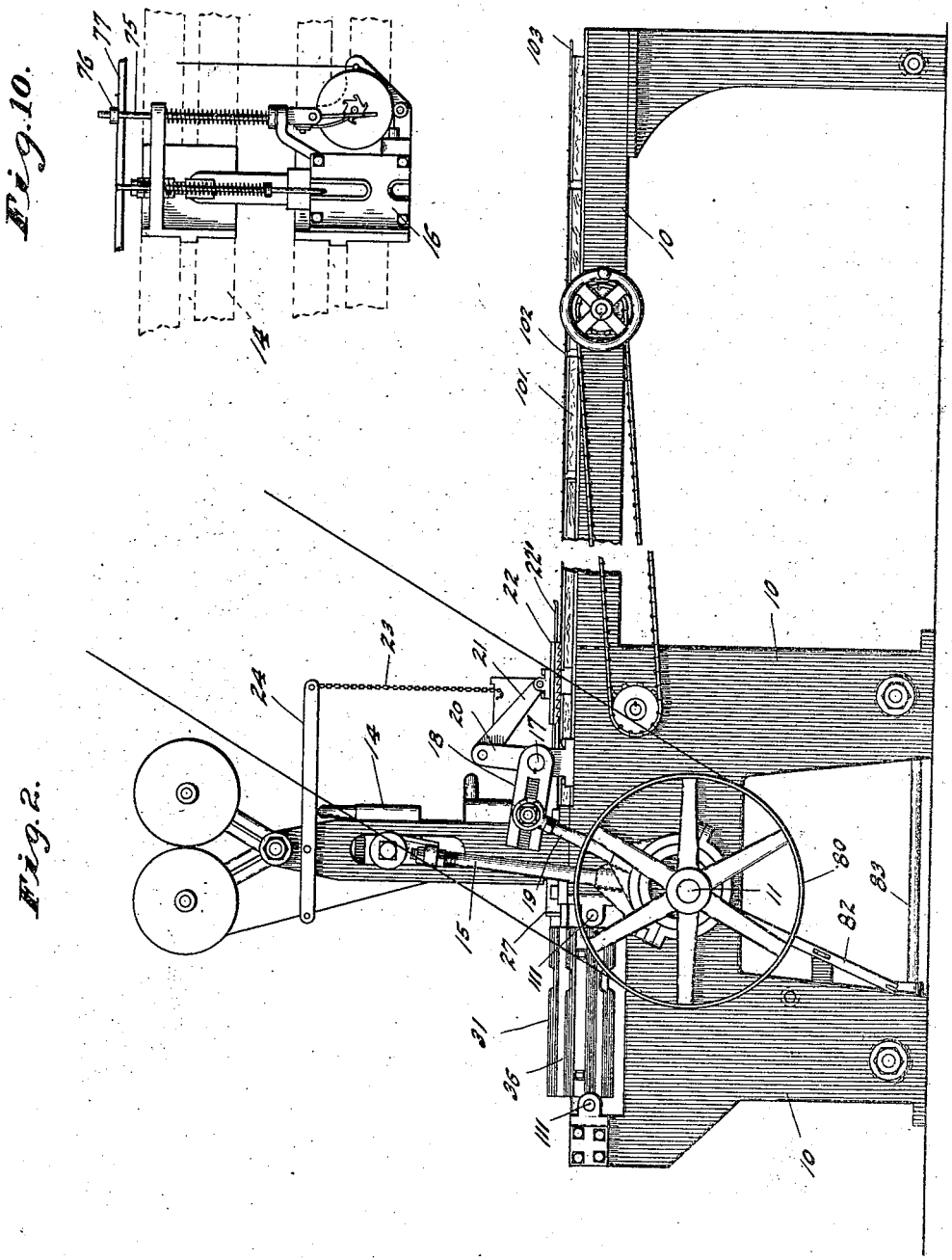

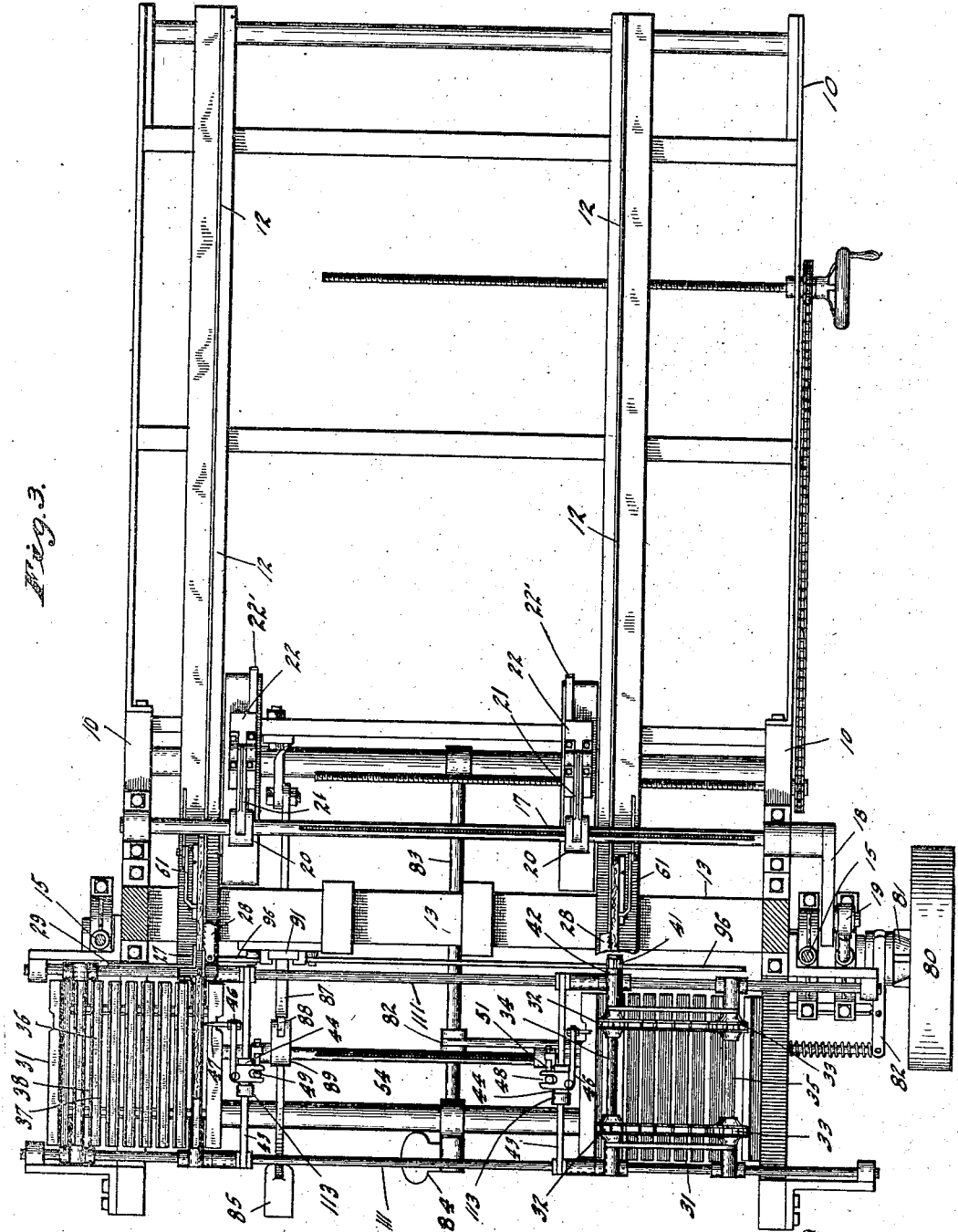

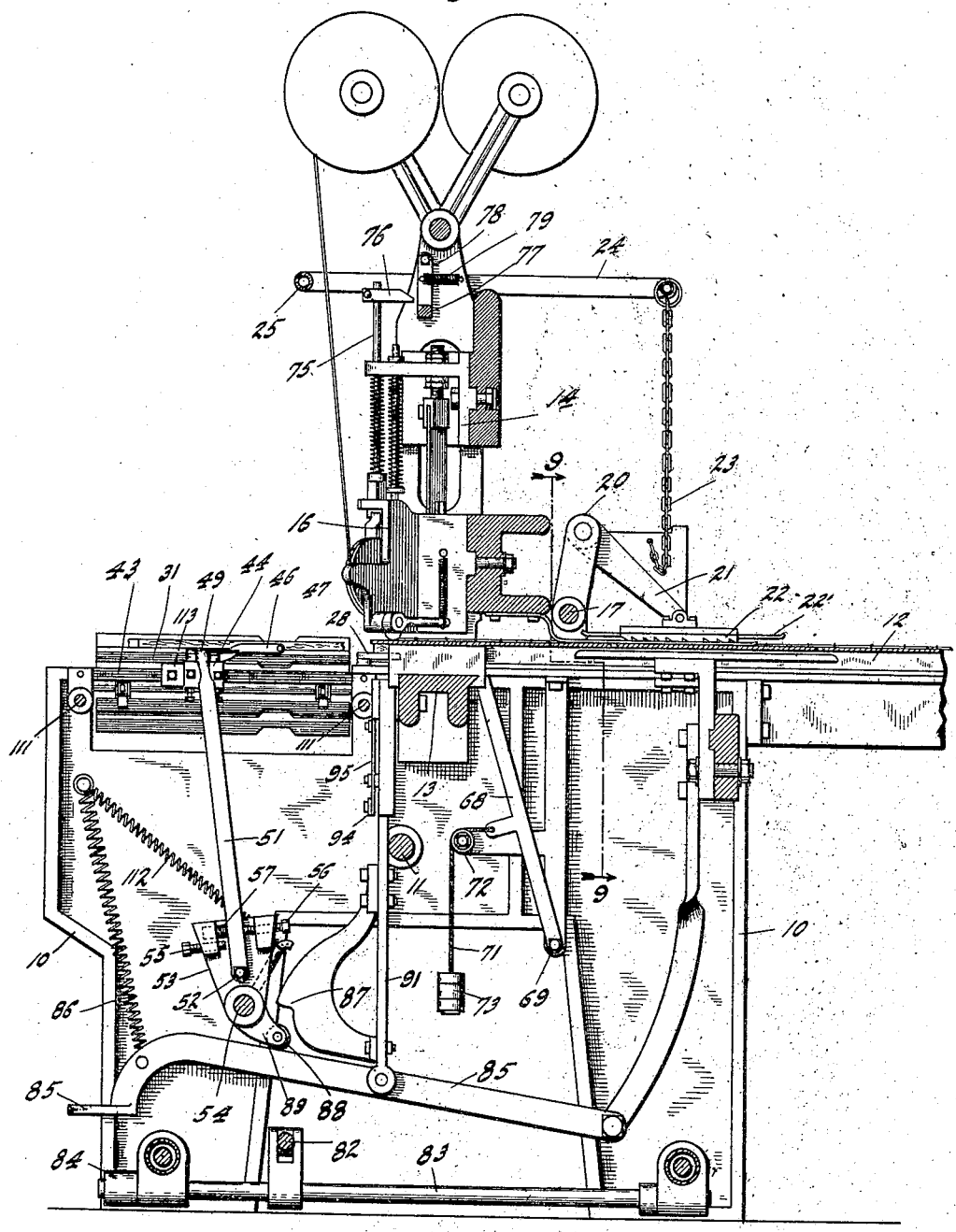

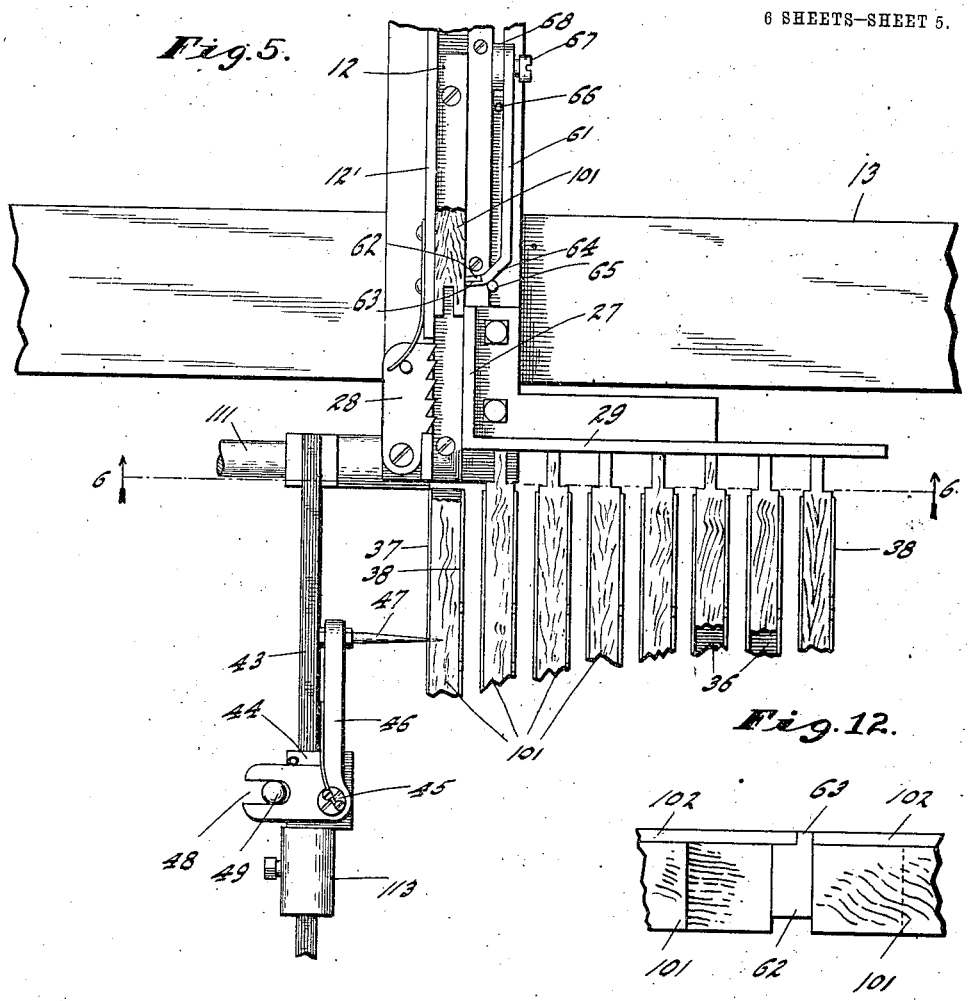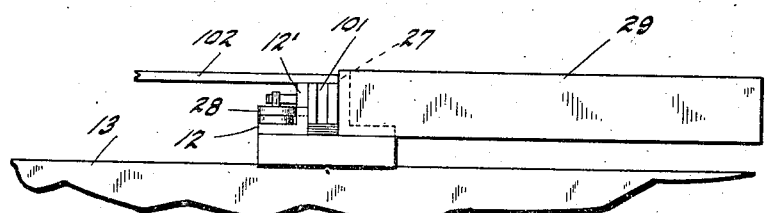

J. H. GREENSTREET.
WIRE BOUND BOX MACHINE.
APPLICATION FILED MAY 11, 1910.
991,716.
Patented May 9, 1911.
6 SHEETS—SHEET 6.
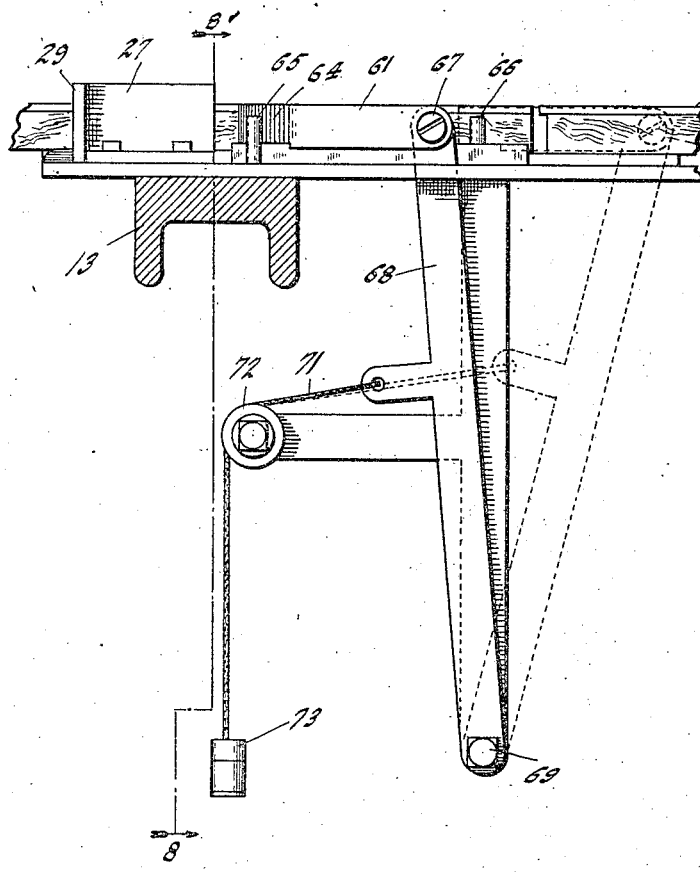
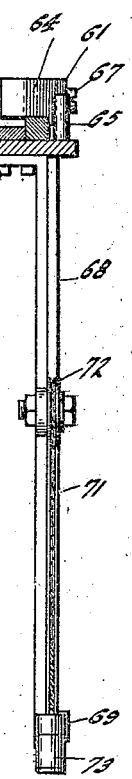
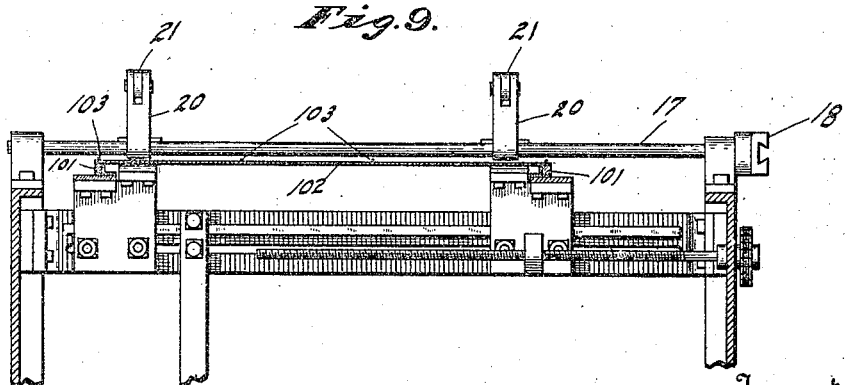

UNITED STATES PATENT OFFICE.

JASON H. GREENSTREET, OF INDIANAPOLIS, INDIANA.

WIRE-BOUND-BOX MACHINE.

991,716. Specification of Letters Patent. Patented May 9, 1911.

Application filed May 11, 1910. Serial No. 560,759.

*To all whom it may concern:*

Be it known that I, JASON H. GREENSTREET, a citizen of the United States, residing at Indianapolis, in the county of Marion and State of Indiana, have invented a certain new and useful Wire-Bound-Box Machine, of which the following is a specification.

In the manufacture of box blanks from veneer or sheet material, cleats and strengthening wires overlying the sheets and attached thereto and to the cleats by suitable staples or other fastenings, it is absolutely essential, in order to produce accurate blanks capable of being folded into rigid and shipable boxes, that the cleats be accurately spaced with relation to each other, and that the sheets be accurately placed upon the cleats and be accurately spaced with relation to each other. It is also desirable, in order that the blanks may be produced as cheaply as possible, that the cleats, sheets, wires and stapling mechanism be under the direct control of the controlling operative and readily accessible by him so as to facilitate the rapid and continuous operation of the machine, and to that end it is desirable that the cleats be automatically and properly delivered in regular sequence to that operative. It is also desirable that the mechanism be such that the cleats may be delivered to the machine by cheap laborers who will not be required to exercise any greater skill or thought than is required to merely deliver the cleats to the machine in regular sequences, thus eliminating the necessity for these laborers to deliver any spacing mechanism to the machine, as has been customary in the most commercial forms of machines heretofore provided for the production of box blanks of the character mentioned.

The object of my present invention is, therefore, to produce a machine having the characteristics above described.

The accompanying drawings illustrate my invention.

Figure 1:
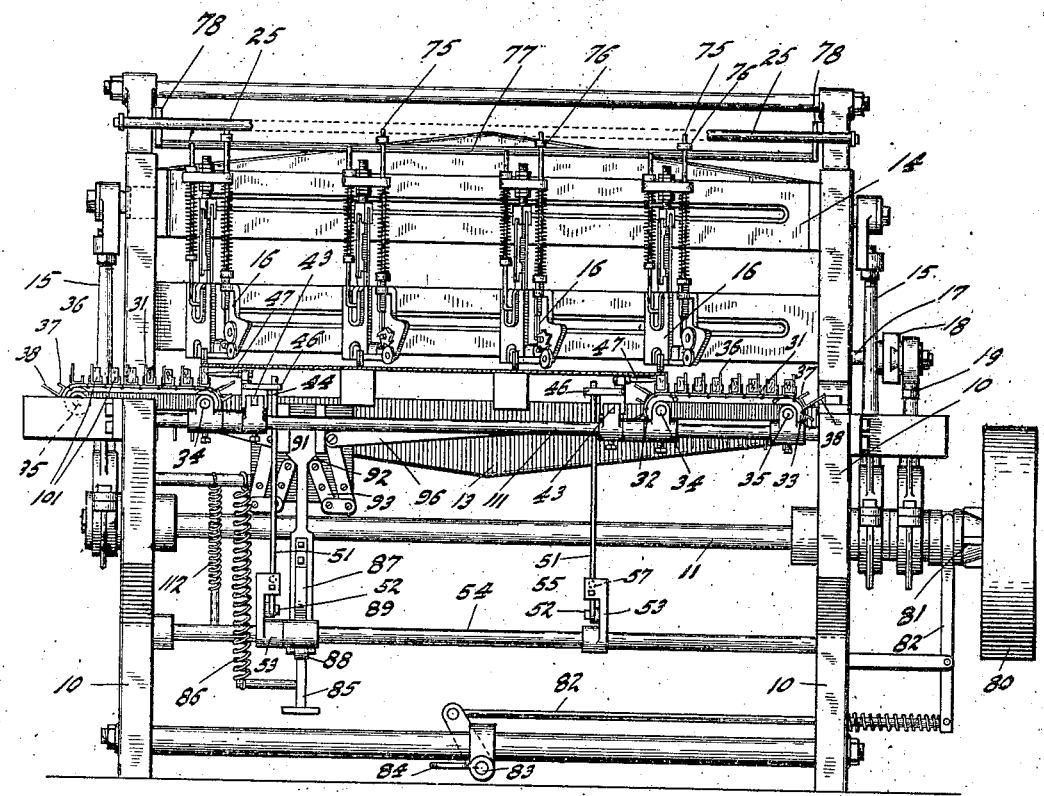
Figure 11:
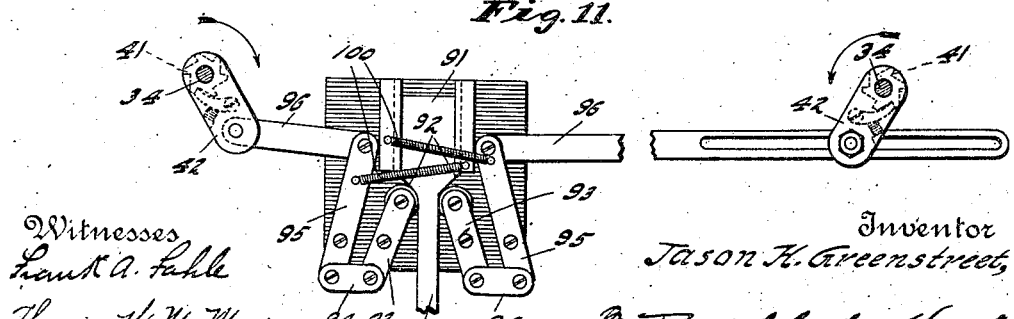

Figure 1 is a front elevation of a machine embodying my invention; Fig. 2 a side elevation; Fig. 3 a sectional plan omitting the stapling mechanism; Fig. 4 a longitudinal section; Fig. 5 a fragmentary plan of one of the cleat feeding and spacing devices; Fig. 6 an elevation from line 6—6 of Fig. 5; Fig. 7 a side elevation of the cleat and sheet spacer; Fig. 8 a section on line 8—8 of Fig. 7; Fig. 9 a section on line 9—9 of Fig. 4; Fig. 10 a detail of the cleat-feeder operating train; Fig. 11 a detail of the stapling head and staple-wire interrupter, and Fig. 12 a detail of the spacing finger.

In the drawings 10 indicates a suitable main frame in which is journaled a main driving shaft 11. The main frame carries two or more longitudinal cleat and sheet guides 12, these guides being of any ordinary or desired form and being relatively transversely adjusted by any suitable means, it being customary to make one of the guides fixed on the main frame and the remainder adjustable toward and from it. The character of this adjusting mechanism is now quite common and forms no part of my present invention. The forward or receiving ends of the guides 12, 12 are arranged adjacent or over a cross-bar or stapling anvil 13 which forms a part of the main frame. Located above the anvil 13 is the usual reciprocating stapling head 14 which is reciprocated by means of pitmen 15 connected to the main drive shaft 11 in the usual manner. The stapling head 14 controls staple forming and driving mechanism 16 of any desired type, one of said devices being arranged above each of the guides 12 and being adjustable in a well known manner.

Arranged above the cleat guides is a rock shaft 17 which extends across the machine and is provided at one end with a slotted arm 18 to which is adjustably connected one end of a pitman 19 connected to the main shaft 11. Shaft 17 carries a series of arms 20, one for each cleat guide 12 and adjustable therewith, and pivoted to each of these arms 20 is a short downwardly and forwardly inclined arm 21 to the lower end of which is pivoted a feed shoe 22, said shoe being properly serrated on its lower face so as to give a sufficient bite into the upper face of sheets of the blank to produce a step-by-step feed of the blank. Shoe 22 may be of any desired length, but in order that it may properly bridge the space between the last sheet of one blank and the first sheet of the succeeding blank, I find it desirable to provide each shoe with an elongated plate 22' having upturned ends as shown. The shoes 22 are sufficiently weighted to cause them to properly engage the sheets of the blanks. The lower ends of the several arms 21 are connected by chains 23 with one end of a lever 24 the opposite end of which is extended to a point within convenient access of the principal operative and provided with a suitable handle 25 so that the operative may readily withdraw the shoes from engagement with the blanks and thus stop the forward feeding thereof without stopping the machine as a whole. At the receiving end of each cleat guide I provide a sheet gage 27 and coöperating with this gage is a pawl 28 the free end of which is normally urged toward the sheet gage by a suitable spring, this pawl being provided in order to prevent any backward movement of the cleats. The gage 27 lies at a distance from the vertical arm 12' of the adjacent cleat guide equal to the thickness or width of the cleat, and at the receiving end of the sheet gage I provide an outwardly projecting cleat gage 29, the purpose of which will appear.

In order to deliver cleats to the cleat guides I provide, adjacent each cleat guide, an endless cleat carrier 31 which, in the form shown in the drawings, consists of an endless belt carried upon suitable wheels 32, 33 carried by shafts 34, 35, respectively, which lie parallel with the cleat guide. The carrier 31 is provided with a plurality of cleat holders 36, each preferably having a forward short vertical flange 37 and a rear higher vertical flange 38, this flange being suitably transversely stiffened for a reason which will appear.

Each of the cleat carriers has to be advanced step by step in order to bring the cleat holders 36 successively into alinement with the adjacent cleat guide 12 and any suitable mechanism may be provided for this purpose. Conveniently the shaft 32, which lies closest to the cleat guide, may be provided with a ratchet wheel 41 operated by means of a pawl lever 42. Cleats will be deposited into the cleat holders 36 by hand in proper sequences, the forward ends of these cleats being shoved up against the cleat gage 29. When a cleat is brought into alinement with its guide it may be shoved forward into position beneath a stapling head by hand, but I prefer to provide a mechanism for this purpose in order that this operation may be accomplished either by power or by foot in order to leave the hands of the operative free to place and control the sheets. I have therefore provided adjacent each cleat carrier a longitudinal rod or guide 43 upon which is slidably mounted a block 44. Pivoted on this block on a vertical pivot 45 is a bell crank lever 46 which, at one end, is provided with a spike or sharpened point 47 which lies substantially at right angles to the cleat guide and in position to be projected into the adjacent vertical face of a cleat when it is brought into alinement with its guide. The other arm of lever 46 is provided with a slot 48 adapted to receive the end 49 of the lever 51. Each lever 51 is pivoted at 52 upon a carrier 53 secured to a rock shaft 54. Carrier 53 is provided with a pair of adjustable stops 55, 56 between which lever 51 may play and the lever is normally yieldingly held against the forward stop 56 by means of a spring 57, this spring being of sufficient strength to propel a cleat from its holder 36 forwardly into association with the adjacent cleat guide until the cleat comes into engagement with some obstruction, whereupon spring 57 will yield so as to permit shaft 54 to complete its movement without injuring the spike 47.

In order to permit a proper folding of the completed blank so as to bring the adjacent ends of cleats into proper overlapping conjunction, it is necessary that the cleats be accurately spaced from each other. For this purpose I provide, adjacent each cleat guide, a spacing finger 61 which, at its free end, is adapted to be projected transversely into the line of movement of the cleats, between the ends of adjacent cleats, and this free end is formed at its lower part 62 of a sufficient thickness and of such form as to properly space the cleats, the shape depending upon the shape of the adjacent ends of the cleats, and its upper part 63 is so formed as to properly space the sheets of the blank, as clearly illustrated in Fig. 12. Finger 61 is provided with a cam portion 64 which, at one end of the longitudinal movement of the finger, is adapted to be engaged by stationary pin 65 which will serve to project the finger into the line of movement of the cleats and, at the opposite end of the longitudinal movement of the finger, is adapted to be engaged by a stationary finger 66 which serves to transversely withdraw the finger 61 from the line of movement of the cleats. Any suitable means may be provided for causing the forward and return movement of finger 61; and these two movements may be either through the same space or along different tracks. In the present embodiment of my invention the finger 61 is pivotally connected by horizontal pivot 67 to the upper end of a swinging arm 68 pivoted at its lower end upon a horizontal pivot 69. Connected to lever 68 is a cord 71 passing over a pulley 72 and provided at its lower end with a weight 73, the weight serving normally to draw finger 61 back into its initial position in engagement with pin 65.

In order to obtain the desired space between the final sheet of one blank and the initial sheet of the next blank without the use of interposed spacing members or blocks. I permit the continued feeding movement of the feeder shoes 22 but interrupt the delivery of staple wire to the stapling forming mechanism. In order to do this the feeding pawl or plunger 75 of each of the staple forming and driving mechanisms is provided with a projection 76 beneath which a cross-bar 77 may be drawn so as to interfere with its staple wire feeding function to any extent desired. This cross-bar 77, carried by fingers 78, is normally held retracted by springs 79 but may be very readily thrown into interrupting position by the operative.

The step-by-step movement of the cleat feeders 31, and the operation of the stapling and feeding mechanism should be under control of the principal operative and for that purpose many different devices may be provided. In the present machine the main drive shaft 11 has a main drive pulley 80 rotatively mounted thereon and a single-rotation clutch connection 81, of ordinary form, forms the connection between the pulley and shaft. The clutch 81 may be thrown into engagement with pulley 80 and held in such engagement for any desired length of time by means of a shifting lever 82, rock shaft 83 and foot lever 84, the staple mechanisms and the feeding shoes continuing in operation as long as the clutch is held in engagement.

Power driven mechanism may be provided for advancing the cleat carriers 31, if desired, and the controlling mechanism for such power driven mechanism may be arranged so as to also control the clutch 81 as well as the clutch feeding spikes 47. In the present form of machine, as illustrated in the drawings, I have provided a foot lever 85. Lever 85 is normally brought to its proper position by means of spring 86 and said lever carries a cam 87 adapted to engage the roller 88 carried by arm 89 secured to shaft 54. Lever 85 also carries a plate 91 provided with a pair of cams 92, 92 adapted to engage a pair of levers 93, 93 which, in turn, are connected by links 94, 94 with multiplying levers 95, 95 which, in turn, are connected by pitmen 96, 96 with the pawl levers 42, 42.

It will be readily understood that the lever 85 might be moved through a complete reciprocation by a single throw clutch mechanism under control of a foot lever; and that such foot lever might be so arranged that, after starting the power driving mechanism for lever 85, it would pass into position to control clutch 81.

The operation is as follows: The upper portions of the two cleat feeding carriers will be loaded with cleats 101 in proper sequences and one of these cleats will be in alinement with each of the cleat guides 12. The principal operative will then step upon lever 85. The first movement of this lever will bring cam 92 into engagement with levers 93 to cause the pawls of arms 42 to engage ratchets 41 and thus move the cleat carriers to bring cleats into alinement with the cleat guides; then cam 87 will come into engagement with roller 88 so as to swing shaft 54. The first action of the movement of this shaft will cause arms 51 to swing levers 46 so as to drive spikes 47 into the two cleats which are in alinement with the cleat guides, the stiffened rear flange 38 of the cleat holder serving as an abutment for the cleat. The continued movement of shaft 54 will drive the blocks 44 forwardly on guides 43 and will thus cause the spikes 47 to project the engaged cleats forwardly out of their holders 36 and into the cleat guides 12. The spacer fingers 61 have been lying in the path of movement of the forward ends of these cleats and will therefore be engaged thereby and driven forward. While this movement of the cleats is taking place the operative will place a sheet 102 upon the cleats with its forward edge in engagement with the portions 63 of fingers 61 so that the sheet will be properly positioned with relation to the cleats, this sheet being moved forwardly by the operative. Thereupon lever 85 is released and lever 84 depressed so as to shift clutch 81 into engagement with the driving pulley 80, thus starting the stapling and feeding mechanisms. The stapling mechanism will move downward first and at this time the new cleats and sheet have been sufficiently projected to bring their initial ends slightly beyond the stapling plane. It is understood, of course, that the stapling mechanism will present strengthening wires 103 above the sheet 102 and the first action of the stapling mechanism will be to staple these wires to the sheet and cleats. The operative may now shove forwardly on the initial portion of the blank so as to drive the cleats, sheet and attached wires forwardly enough to receive another set of staples, and this action is repeated (springs 57 yield sufficiently to allow the cleats to be shoved beneath the spikes 47) until the forward edge of the blank comes beneath the feed shoes 22, after which time the reciprocation of these feed shoes, reciprocating alternately with the stapling mechanism, will automatically cause advancement of the blank through the machine. This advancement will continue until the rear ends of the cleats have passed slightly beyond the cleat gages 29 whereupon the operative will release lever 84 so that it may be drawn back to its initial position, thus restoring the parts to normal and stopping the machine. As the lever 85 moves to its initial position cams 92 will be withdrawn from between levers 93 and levers 95 will be drawn together by springs 100 so as to cause the pawls of arms 42 to take a new hold on ratchets 41. During the forward advancement of the first pair of cleats fingers 61 have been moved forwardly in front of the cleats until their cams 54 have been brought into engagement with the adjacent pins 66 and these pins have served to withdraw the fingers 61 from the paths of movement of the cleats. As soon as this withdrawal is effected weights 73 will serve to draw the fingers back into engagement with pins 65 but the passing cleats will prevent the complete return movement of the fingers until the rear ends of the cleats have passed beyond the same, whereupon the weights will serve to drive the cams 64 of fingers 61 against pins 65 so as to project the fingers into the cleat line. As soon as this return movement of fingers 61 is effected the operator will take another sheet 102 and repeat the operation already described.

If four-sided boxes are being produced the operator will, when the fourth side is passing beneath the stapler head, permit the feeding stapling action to continue until the rear ends of the cleats on the fourth side have passed beyond the stapling head by any desired amount and, in order to prevent waste of stapling wire, he will throw rod 77 into position to interrupt the feeding action of the staple wire feeder 75. This will serve to continue the forward movement of the strengthening wires 103 so as to provide any desired amount of wire between the two blanks.

The action of the spacer blocks 61 is entirely automatic and it will be noticed that these spacer members form permanent portions of the machine so that they cannot become lost or misplaced. Their action is entirely automatic and they serve to definitely space both the cleats and the sheets.

The cleat feeders 31 will be kept filled by two boys and no especial degree of skill is required to perform this work, it being merely necessary that the cleats be placed in the feeders in proper sequences.

The cleat carrier shafts are journaled in boxes which are mounted on the cross-bars 111 so that the carriers may be adjusted, as a whole, along said bars so as to properly aline with the cleat guides.

Carriers 53 are returned to initial position by a spring 112 which brings blocks 44 back against adjustable stops 113.

I claim as my invention:

1. In a box machine, the combination of a cleat guide, a cleat holder, means for shifting said cleat holder laterally into and out of alinement with the cleat guide, a spacing member projectable into and withdrawable from the cleat guide in front of a cleat presented by said cleat holder, and a propeller arranged to engage the successively presented cleats and drive them into the cleat guide to the rear of said spacing member.

2. In a box machine, the combination of a cleat guide, a cleat holder, means for shifting said cleat holder laterally into and out of alinement with the cleat guide, and a spacing member projectable into and withdrawable from the cleat guide in front of a cleat presented by said cleat holder.

3. In a box machine, the combination of a cleat guide, a cleat holder, means for shifting said cleat holder laterally into and out of alinement with the cleat guide, and a propeller arranged to engage the successively presented cleats and drive them into the cleat guide.

4. In a box machine, the combination of a cleat guide, a cleat carrier comprising a plurality of cleat holders, means for bringing the holders of said cleat carrier successively into alinement with the cleat guide, a spacing member projectable into and withdrawable from the cleat guide in front of a cleat presented by said cleat holder, and a propeller arranged to engage the successively presented cleats and drive them into the cleat guide to the rear of said spacing member.

5. In a box machine, the combination of a cleat guide, a cleat carrier comprising a plurality of cleat holders, means for bringing the holders of said cleat carriers successively into alinement with the cleat guide, and a spacing member projectable into and withdrawable from the cleat guide in front of a cleat presented by said cleat holder.

6. In a box machine, the combination of a cleat guide, a cleat carrier comprising a plurality of cleat holders, means for bringing the holders of said cleat carriers successively into alinement with the cleat guide, and a propeller arranged to engage the successively presented cleats and drive them into the cleat guide.

7. In a box machine, the combination of a cleat guide, an endless cleat carrier comprising a plurality of cleat holders successively alinable with the cleat guide, means for successively alining the cleat holders with the cleat guide, and a propeller for engaging the successively presented cleats and propelling them into the cleat guide.

8. In a box machine, the combination with a cleat guide, of a feeding member for the cleats comprising a laterally and longitudinally movable spur, and an operating member engaging said spur to initially move the same laterally into engagement with the cleat and thereafter move the same longitudinally in the direction of the cleat guide.

9. In a box machine, the combination with a cleat guide, a carrier movable longitudinally of the cleat guide, a cleat-engaging spur mounted on said carrier and movable laterally thereon into and out of engagement with a cleat within the cleat guide, an operating member engaging said spur to cause an initial lateral movement of the spur and a subsequent longitudinal movement of the carrier and spur.

In witness whereof, I have hereunto set my hand and seal at Indianapolis, Indiana, this sixth day of May, A. D. one thousand nine hundred and ten.

JASON H. GREENSTREET. [L. S.]

Witnesses:
ARTHUR M. HOOD,
THOMAS W. MCMEANS.